Nov. 20, 1923.                    R. W. WELTY                    1,475,098
                               AUTOMOBILE RIM
                             Filed Sept. 9, 1922
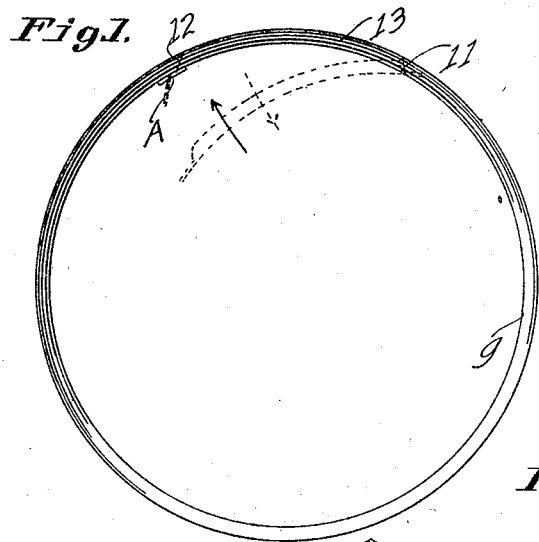
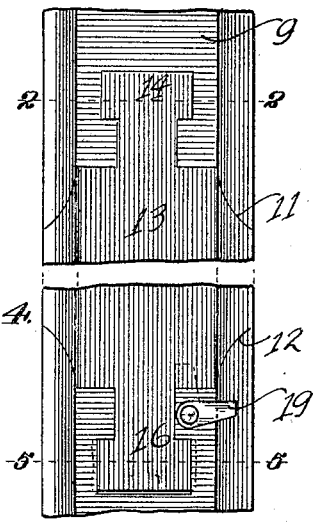
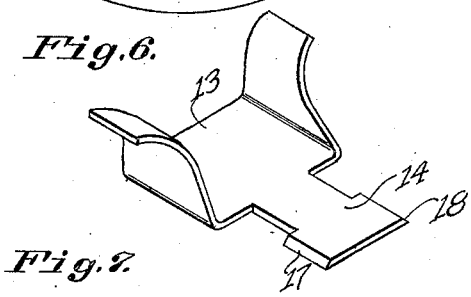
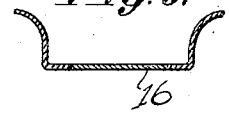
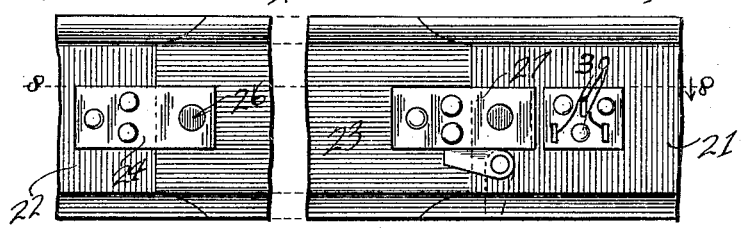
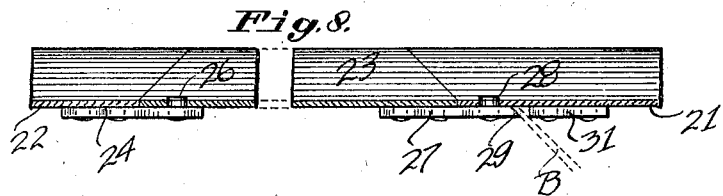
Inventor
R. W. Welty
By Victor J. Evans
    Attorney.

Patented Nov. 20, 1923.

1,475,098

UNITED STATES PATENT OFFICE.

RUFUS W. WELTY, OF SAN FRANCISCO, CALIFORNIA.

AUTOMOBILE RIM.

Application filed September 9, 1922. Serial No. 587,122.

*To all whom it may concern:*

Be it known that I, RUFUS W. WELTY, a citizen of the United States, residing at San Francisco, in the county of San Francisco and State of California, have invented new and useful Improvements in Automobile Rims, of which the following is a specification.

This invention relates to improvements in automobile rims, and has particular reference to that type of rim upon which an automobile tire or casing is placed previous to the slipping of the rim and its tire upon the felly of the wheel.

The principal object of this invention is to provide a tire rim which may be assembled or disassembled without the use of a jack or other expanding tool other than an ordinary screw driver or similar prying tool.

Another object is to provide a rim having a removable section, which section when in place is permanently locked against accidental displacement.

A further object is to provide a rim of this character which is simple in construction, cheap to manufacture and well within the purchase price of the average user.

A still further object is to provide a rim of this character which may be employed with any well known make of tire, now upon the market, and one which may be employed with any standard form of wheel.

Other objects and advantages will be apparent during the course of the following description.

In the accompanying drawings forming a part of this specification, and in which like numerals are employed to designate like parts throughout the same, Figure 1 is a side elevation of my rim, Figure 2 is a cross-section taken on the line 2—2 of Figure 3, Figure 3 is an enlarged fragmentary detail view showing the manner of locking one end of the removable section, Figure 4 is an enlarged fragmentary detail view showing the manner of locking the opposite end of the removable section, Figure 5 is a cross-section taken on the line 5—5 of Figure 4, Figure 6 is a perspective view of one of the ends of the removable section, Figure 7 is a plan view of a modified form of my device, and Figure 8 is a cross-section taken on the line 8—8 of Figure 7.

Applicant is aware of the fact that rims have been employed which have a removable section, but applicant is not aware of any sections constructed in accordance with his invention, which invention eliminates the difficulties encountered by the other rims, such as the employment of jacks, pinching of the fingers, and other objections too numerous to mention.

In the accompanying drawings wherein for the purpose of illustration is shown a preferred embodiment of my invention, the numeral 9 designates a tire rim which is formed of channel iron, a cross-section of which is best shown in Figure 2. This rim has its ends champered as shown at 11 and 12, the purpose of which will be later seen. At 13, I have shown a removable section, which section has the same cross-section as that of the rim section 9. This removable section 13 is provided with T shaped ends as is best shown at 14 and 16 of Figure 4. It will be noted that the sides of the T shaped portions are beveled as shown at 17 and 18 of Figure 6, and by referring to Figure 2, it will be noted that the bevels on the ends 14 and 16 are opposed one to the other, the reason for which will be later seen. It will also be noted that the section 13 is provided with champered ends, which ends are adapted to contact the champered ends 11 and 12 of the rim section 9 so as to form a continuous channel for the reception of the tire. These T heads 14 and 16 of the section 13 are each adapted to engage a T shaped slot formed on the opposite ends of the rim 9, it of course being understood that the rim slot is also beveled to receive the beveled portions 17 and 18 of the T head.

In assembling this device, the tire is placed upon the rim section 9 by slightly contracting the same, and then the removable section 13 is brought into the dotted line position of Figure 1. This position brings the T portion 14 of the section 13 at a point between the tire and the rim. As the rim is then moved in the direction of the solid arrow, the T section will engage its slot in the rim with the result that the champered ends of the rim adjacent the T 14 will prevent outward movement of this end of the section, and the beveled edges of the T will prevent downward movement with respect to the rim, with the result that these ends will be held in perfect locked alignment with one another. During this operation, the opposite end of the section will have approached the opposite end of the rim 9 and will lie thereagainst, but owing to the fact that the tire is to be stretched, engagement of the T head 16 with its respective slot cannot be accomplished without employing a prying implement.

By placing a screw driver in the position A of Figure 1, prying engagement can be obtained against the end of the rim and the end of the T head, with the result that with very little effort, a strong leverage will result and the T head 16 will be forced into its slot. As soon as the same has entered the slot, a dog 19 is moved to its dotted line position of Figure 4 and serves to hold the T head 14 in its engagement with its respective slot.

In the modified form shown in Figures 7 and 8, the numeral 21 represents one end of the rim, while the numeral 22 represents the opposite end of the rim and the numeral 23 a removable section. The ends of the rim are champered as in the preferred form, and also the ends of the removable section. At 24, I have shown a lug riveted to the end 22 and carrying a pin 26, which pin is adapted to enter a hole formed in the section 23. At 27, I have shown a lug riveted to the section 23 and carrying a pin 28, which pin is adapted to enter a hole provided in the end 21 of the rim. This last mentioned lug 27 is beveled as shown at 29 and a lug 31 is riveted to the rim 21 at a point adjacent the end of the lug 27. This arrangement provides for the accommodation of a screw driver as shown in dotted lines at B for the purpose of prying the lug 29 and the pin 28 out of engagement with the end 21 or for forcing them back into place. At 30, I have shown slots formed in the lug 31, which slots may be used for placing the point of the screw driver therein in order to give a prying leverage and by staggering these slots a gradual advancement of the prying point is obtained.

It will be seen that in this modified form, the operation of assembling and disassembling is the same as in the preferred form, the difference residing in the provision of lugs instead of T heads.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a rim section having champered ends, said champers diverging inwardly, a T shaped slot formed in each end of said rim, bevel portions formed in said T shaped slot, a removable section having champered ends adapted to engage the champered ends of said rim, a T shaped projection formed on each end of said section, bevel portions formed on said T shaped projections, said beveled sections being adapted to engage the beveled portion of said T shaped slots, and means for locking said removable section against accidental displacement.

2. A device of the character described, a rim section having champered ends, said champers diverging inwardly, a T shaped slot formed in each end of said rim, bevel portions formed in said T shaped slot, a removable section having champered ends and adapted to engage the champered ends of said rim, a T shaped projection formed in each end of said section, bevel portions formed on said T shaped projections, said bevel sections being adapted to engage the bevel portion of said T shaped slots, means for locking said removable section against accidental displacement, a lug secured to one end of said rim section, a lug secured to one end of said removable section at a point adjacent said first mentioned lug, said second mentioned lugs having staggered openings formed therein, substantially as and for the purpose specified.

In testimony whereof I affix my signature.

RUFUS W. WELTY.